(12) United States Patent
Won

(10) Patent No.: US 8,912,673 B2
(45) Date of Patent: Dec. 16, 2014

(54) APPARATUS AND METHOD FOR RECOVERING EXHAUST KINETIC ENERGY

(71) Applicant: Hyundai Motor Company, Seoul (KR)

(72) Inventor: Jong Seung Won, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 13/839,840

(22) Filed: Mar. 15, 2013

(65) Prior Publication Data

US 2013/0328308 A1   Dec. 12, 2013

(30) Foreign Application Priority Data

Jun. 8, 2012   (KR) .................. 10-2012-0061563

(51) Int. Cl.
| | |
|---|---|
| *F03B 13/00* | (2006.01) |
| *F03B 13/10* | (2006.01) |
| *H02P 9/04* | (2006.01) |
| *H02K 99/00* | (2014.01) |
| *F01N 5/04* | (2006.01) |

(52) U.S. Cl.
CPC . *F01N 5/04* (2013.01); *Y02T 10/16* (2013.01); *Y02T 10/641* (2013.01); *F01N 2240/36* (2013.01); *H02K 57/003* (2013.01)
USPC .......................................... 290/43

(58) Field of Classification Search
CPC ..... F01N 5/04; F01N 2240/36; H02K 57/003; H02K 57/00; Y02T 10/641; Y02T 10/16; Y02T 10/166
USPC ..................... 290/43, 44, 55, 54, 1 R; 60/597
See application file for complete search history.

(56) References Cited

U.S. PATENT DOCUMENTS 1,583,621 A  *  5/1926  Steinberg ...................... 60/597

FOREIGN PATENT DOCUMENTS

| KR | 1019970044340 | 7/1997 |
| KR | 1020010090071 | 10/2001 |

* cited by examiner

*Primary Examiner* — Javaid Nasri
(74) *Attorney, Agent, or Firm* — Edwards Wildman Palmer LLP; Peter F. Corless

(57) ABSTRACT

An apparatus and method for recovering exhaust kinetic energy. The apparatus includes a valve assembly, a motor generator and a controller. The valve assembly includes a rotary shaft which is disposed in an exhaust gas pipe and a flap which is disposed on the rotary shaft. The flap is rotated by an exhaust gas that is ejected. The motor generator is connected to the rotary shaft of the valve assembly, and in a first instance generates electricity using a rotational force transmitted from the rotary shaft and in a second instance applies a torque to the rotary shaft. The controller fixes the rotary shaft of the valve assembly at a predetermined angle in the first instance and adjusts the speed of rotation of the rotary shaft by controlling the motor generator in the second instance.

12 Claims, 3 Drawing Sheets

APPARATUS AND METHOD FOR RECOVERING EXHAUST KINETIC ENERGY

CROSS-REFERENCE TO RELATED APPLICATION

This application claims priority under 35 U.S.C. §119 to Korean Patent Application No. 10-2012-0061563 filed on, Jun. 8, 2012, the disclosure of which is hereby incorporated by reference in its entirety.

BACKGROUND

1. Field of the Invention

The present invention relates, in general, to an apparatus for recovering exhaust kinetic energy which recovers kinetic energy from exhaust having a high pressure that is discharged while of a vehicle is being driven.

2. Description of the Related Art

In general, in a vehicle which is equipped with an internal combustion engine, fuel is burned inside the internal combustion engine, and in the process of producing power, high-temperature and high-pressure gas is discharged due to the burning of fuel. This discharge is referred to as exhaust.

Exhaust systems typically directly discharge high-temperature and high-pressure gas that has been burned in the internal combustion engine into the air. However, in response to environmental problems, such as the increasing emission of carbon dioxide and global warming, which are continuously worsening, energy efficiency is attracting more attention. Accordingly, the current trends are toward rapid development of an apparatus for recovering exhaust heat which recovers heat from an exhaust gas have been developed.

However, conventionally a recycling system which simply recovers and recycles exhaust heat having a high temperature has a problem in that the energy from the exhaust gas that is ejected under a high pressure is discharged and wasted. In order to recover the kinetic energy of the exhaust gas, a power generator is provided by adding an exhaust gas pipe. However, when the exhaust gas pipe is added, the weight of the vehicle increases, as does material cost and workload, which is problematic. Therefore, a technology is required that can enable power generation by recovering the kinetic energy of the exhaust gas that is ejected under a high pressure, while enabling energy management and protecting the environment without adding any unnecessary components such as the exhaust pipe.

The information disclosed in the Background of the Invention section is only for the enhancement of understanding of the background of the invention, and should not be taken as an acknowledgment or any form of suggestion that this information forms a prior art that would already be known to a person skilled in the art.

SUMMARY

Accordingly, the present invention has been made keeping in mind the above problems currently occurring, and the present invention is intended to propose an apparatus for recovering exhaust kinetic energy which enables energy management and improves environmental impact by generating electricity via recovering the kinetic energy of an exhaust gas that is ejected under a high pressure.

In order to achieve the above object, according to one aspect of the present invention, there is provided an apparatus for recovering exhaust kinetic energy. The apparatus includes a valve assembly including a rotary shaft which is disposed in an exhaust gas pipe and a flap which is disposed on the rotary shaft, the flap being rotated by exhaust gas that is ejected. Additionally, a motor generator, connected to the rotary shaft of the valve assembly, generates electricity using a rotational force transmitted from the rotary shaft or applies a torque to the rotary shaft. Furthermore, a controller is configured to fix the rotary shaft of the valve assembly at a predetermined angle or adjust the speed of rotation of the rotary shaft by controlling the motor generator.

The apparatus may further include a space section in a partial region of the exhaust gas pipe, the space section protruding from a side of the exhaust gas pipe and communicating with the exhaust gas pipe. The valve assembly may be disposed between the space section and an inner space of the exhaust gas pipe.

More specifically, the rotary shaft of the valve assembly may be positioned inside an inner space when the space section communicates with the exhaust gas pipe or at the portion when the outer periphery of the exhaust gas pipe extends. The flap may be configured such that the flap closes the inner space of the space section when the flap is oriented parallel to an ejection flow of the exhaust gas.

The motor generator may have a rotation angle detector which detects an angle of rotation of the rotary shaft of the valve assembly and sends the angle of rotation of the rotary shaft to the controller. The controller may initialize the flap by controlling the motor generator when power generation due to the exhaust gas is required when the flap is fixed in a stationary position. The controller may forcibly rotate the flap using the motor generator so that a remainder of the exhaust gas inside the exhaust gas pipe is discharged therefrom when a vehicle is accelerated in a stopped state. The controller may adjust the flap to be parallel with an ejection flow of the exhaust gas by controlling the motor generator when a backpressure due to the exhaust gas is required to be reduced.

Additionally, the controller may tune discharge noises of the exhaust gas by fixing the flap at a predetermined angle using the motor generator. Also, the controller may tune discharge noises of the exhaust gas by controlling the speed of rotation of the flap by adjusting the rotational torque of the motor generator.

According to one aspect of the present invention, there is provided a method of recovering exhaust kinetic energy using the above-described apparatus for recovering exhaust kinetic energy. The method includes the following steps of: checking whether or not a vehicle is in a stopped state; when the vehicle is in the stopped state, forcibly rotating the flap of the valve assembly using the motor generator at a time point when the vehicle starts being driven; when the vehicle is not in the stopped state, checking whether or not the vehicle is being accelerated; when the vehicle is being accelerated, fixing the flap to be parallel to an ejection flow of the exhaust gas; and when the vehicle is not being accelerated, generating electricity from the exhaust gas that is ejected using the motor generator.

According to the apparatus for recovering exhaust kinetic energy having the above-described structure, it is possible to enable energy management and protect the environment by generating electricity by recovering the kinetic energy of an exhaust gas that is ejected under a high pressure. In particular, the space section is formed at the side of the exhaust gas pipe and the valve assembly connected to the motor generator is disposed inside the space section and the exhaust gas pipe. It is therefore possible to generate electricity by recovering the kinetic energy from the exhaust gas without adding any exhaust gas pipe to the system, reduce the cost of materials, and reduce the weight of the vehicle and the workload required.

In addition, when the vehicle is being accelerated, the flap of the valve assembly is adjusted to be parallel to the ejection flow of the exhaust gas, thereby minimizing the occurrence of backpressure and maintaining vehicle acceleration. When the vehicle starts being driven from the stopped state, the remainder of the exhaust gas inside the exhaust gas pipe is discharged by forcibly rotating the flap using the motor generator, thereby improving engine torque and fuel efficiency. Furthermore, it is possible to tune discharge noises of the exhaust gas to a level as required by a driver by adjusting and fixing the flap based on a separate setting.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
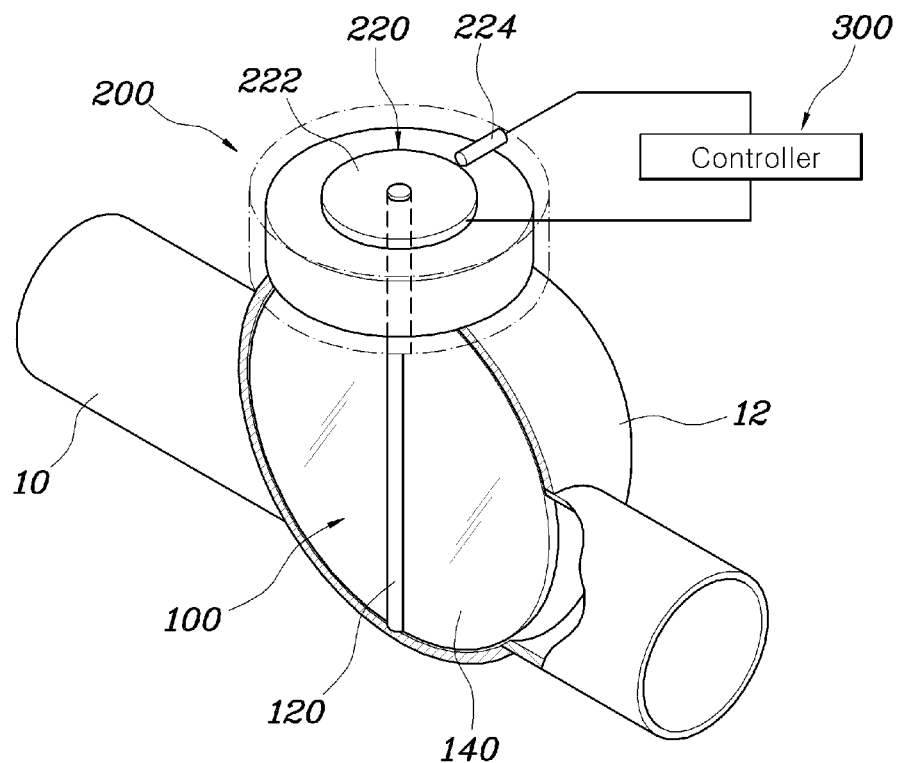
FIG. 1 is a perspective view showing an apparatus for recovering exhaust kinetic energy according to an exemplary embodiment of the present invention.

Reference will now be made in greater detail to an apparatus and method for recovering exhaust kinetic energy according to the present invention, embodiments of which are illustrated in the accompanying drawings. Wherever possible, the same reference numerals will be used throughout the drawings and the description to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 1 is a perspective view showing an apparatus for recovering exhaust kinetic energy according to an exemplary embodiment of the present invention. The apparatus for recovering exhaust kinetic energy includes a valve assembly 100, a motor generator 200 and a controller 300. The valve assembly 100 includes a rotary shaft 120 which is disposed on an exhaust gas pipe 10 and a flap 140 which is disposed on the rotary shaft 120 such that it is rotated by an exhaust gas that is ejected. The motor generator 200 is connected to the rotary shaft 120 of the valve assembly 100, and generates power using a rotational force transmitted from the rotary shaft 120, or applies torque to the rotary shaft 120. The controller 300 may be configured to maintain the rotary shaft 120 of the valve assembly 100 at a predetermined angle or adjusts the speed of rotation of the rotary shaft 120 by controlling the motor generator 200.

Describing the apparatus for recovering exhaust kinetic energy in more detail, the valve assembly 100 having the rotary shaft 120 and the flap 140 which rotates about the rotary shaft 120 is provided on the exhaust gas pipe 10 such that the rotational force that has been generated by the flap 140 which is rotated by the exhaust gas that is ejected through the pipe 10 is transmitted to the motor generator 200 through the rotary shaft 120.

In addition, the motor generator 200 connected to the rotary shaft 120 of the valve assembly 100 generates electricity using the rotational force received from the rotary shaft 120 or rotates or fixes (maintains) the rotary shaft 120 at a predetermined angle by applying a rotational force or fixing force to the rotary shaft 120 using electric power that has been supplied to the motor generator 200. In addition, the controller 300 may control the motor generator 200 so that the flap 140 is oriented parallel to the ejection flow of the exhaust gas when backpressure is required to be reduced, and controls the rotary shaft so that the flap 140 is rotated by the exhaust gas that is ejected when power generation is required.

Here, the controller 300 controls the motor generator 200 based on information that has been detected using a speed sensor and a revolution per minute (RPM) sensor which are disposed within a vehicle. When operating at a low speed or decelerating based on the detected information, the controller 300 adjusts the flap 140 to a predetermined angle and thus causes the flap 140 to be rotated by the ejected exhaust gas, thereby generating electricity. When operating at a high speed or during acceleration, the controller 300 controls the flap 140 to be parallel to the direction in which the exhaust gas flows, thereby minimizing backpressure and allowing the exhaust gas to be discharged rapidly.

Specifically describing the structure of the present invention, the apparatus for recovering exhaust kinetic energy of the present invention has a space section 12 in a partial region of the exhaust gas pipe 10. The space section 12 protrudes from the side of the exhaust gas pipe 10 and communicates with the exhaust gas pipe 10. The valve assembly 100 is disposed between the space section 12 and the inner space of the exhaust gas pipe 10.

Figure 2:
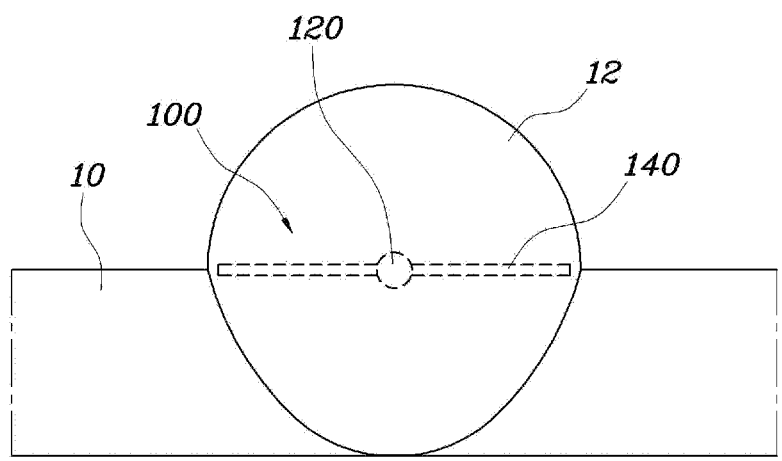
FIG. 2 is a top plan view showing a space section of the apparatus for recovering exhaust kinetic energy shown in FIG. 1.

FIG. 2 is a top plan view showing the space section 12 of the apparatus for recovering exhaust kinetic energy shown in FIG. 1. The rotary shaft 120 of the valve assembly 100 is positioned inside the inner space where the space section 12 communicates with the exhaust gas pipe 10, specifically, at the portion when the outer periphery of the exhaust gas pipe 10 extends. The flap 140 may be configured such that the flap 140 closes the inner space of the space section 12 when it is oriented parallel to the ejection flow of the exhaust gas.

Here, the space section 12 of the exhaust gas pipe 10 can be configured to be separate from the exhaust gas pipe 10 so as to be connected to the exhaust gas pipe 10. Alternatively, the space section 12 can be formed by bulging the exhaust gas pipe 10 during manufacturing of the exhaust pipe 10.

According to the present invention having the above-described configuration, the space section 12 is formed so as to "bulge" or project outward in a spherical manner from the side of the exhaust gas pipe 10, thereby fundamentally preventing resistance from occurring when ejecting the exhaust gas. Consequently, the flap 140 of the valve assembly 100 is subjected to a large rotational force.

More specifically, when the valve assembly 100 is positioned inside the exhaust gas pipe 10, the flap 140 creates resistance against to the ejection flow of the exhaust gas even if the flap 140 is fixed parallel to the ejection flow of the exhaust gas. Consequently, the exhaust gas is not smoothly ejected. However, as shown in FIG. 2, the space section 12 is formed at the side of the exhaust gas pipe 10 and the valve assembly 100 is disposed inside the space section 12 and the exhaust gas pipe 10. This fundamentally prevents resistance from occurring in the ejection flow of the exhaust gas. In addition, the flap 140 is disposed at the position when the outer side periphery of the exhaust gas pipe 10 extends, about the rotary shaft 120, such that one-directional force is generated by the exhaust gas that is ejected, thereby generating a significant rotational force.

In the meantime, the space section 12 which is provided in the exhaust gas pipe 10 is configured such that the inner space is closed when the flap 140 of the valve assembly 100 is oriented parallel to the ejection flow of the exhaust gas. In the case when the backpressure due to the exhaust gas is required to be reduced, when the exhaust gas that is ejected flows through the inner space of the space section 12, resistance occurs during ejection of the exhaust gas, thereby increasing the backpressure. However, since the flap 140 is oriented parallel to the ejection flow of the exhaust gas, it is possible to minimize the resistance that occurs against the ejection flow of the exhaust gas when the inner space of the space section 12 is closed. At this time, when the flap 140 is fixed parallel to the ejection flow of the exhaust gas using the motor generator 200, a fixing force may be applied to the rotary shaft 120 before starting power generation so that the flap 140 is rotated again under the pressure of the exhaust gas that is ejected.

According to the above-described structure of the apparatus for recovering exhaust kinetic energy, it is possible to generate electricity by recovering kinetic energy from the exhaust gas that is ejected without any additional components added onto the exhaust gas pipe 10, thereby reducing the cost of materials, workload and the weight of a vehicle.

Figure 3:
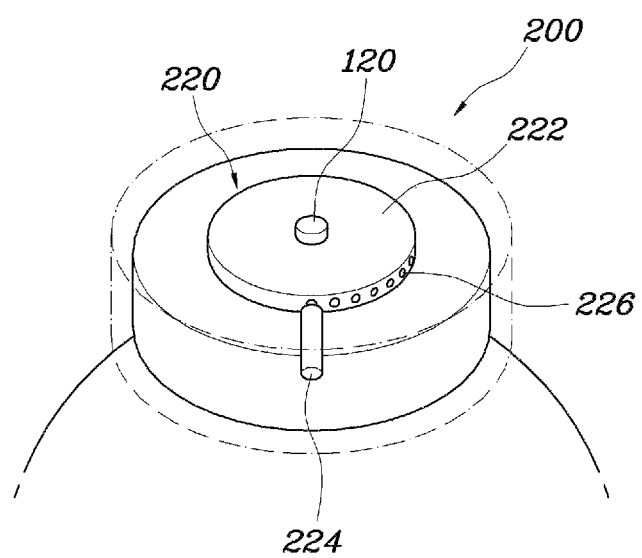
FIG. 3 is a perspective view showing the motor generator of the apparatus for recovering exhaust kinetic energy shown in FIG. 1.

FIG. 3 is a perspective view showing the motor generator 200 of the apparatus for recovering exhaust kinetic energy shown in FIG. 1. The motor generator 200 has a rotation angle detector 220 which detects an angle of rotation of the rotary shaft 120. The rotation angle detector 220 may detect the angle of rotation of the rotary shaft 120 and sends it to the controller 300. The rotation angle detector 220 may be implemented as a Hall sensor which detects the angle of rotation of the rotary shaft 120.

Describing the rotation angle detector 220 in detail, the motor generator 200 further includes a plate 222 which has apertures 226 in the side thereof, the apertures 226 being formed at regular intervals, and a sensor 224 which corresponds to the apertures 226 in the plate 222. The apertures 226 formed in the plate 222 are given a reference angle, and are arranged at regular intervals within the range of 90 degrees from the reference angle. The reference angles may be parallel to the direction in which the exhaust gas is ejected or positions that correspond to the ejection flow of the exhaust gas. Of course, the apertures 226 of the plate 222 can be further formed beyond the range of 90 degrees. However, it is unnecessary to form the apertures 226 beyond 90 degrees since the space section 12 can be sufficiently opened/closed and be adjusted to any angle as required when the flap 140 is adjusted by forming the apertures 226 up to 90 degrees. Consequently, in the apparatus for recovering exhaust kinetic energy having this structure, the flap 140 of the valve assembly 100 can be adjusted and fixed at various angles when a fixing force is applied to the generator 200 under the control of the controller 300.

The rotation angle detector 220 can be implemented as a magnetic sensor, as well as the Hall sensor. When the Hall sensor is applied, it is possible to adjust the angle of rotation by applying pin or half-moon type structures to the plate 222 in place of the aperture type structures.

When power generation using the exhaust gas is required in the state in which the flap 140 is stopped, the controller 300 initializes the flap 140 by controlling the motor generator 200. The initialization refers to an operation of controlling the angle of the flap 140 of the valve assembly 100 so that the flap 140 corresponds to the ejection flow of the exhaust gas using the motor generator. Consequently, the flap 140 is moved to an orientation parallel to the ejection flow of the exhaust gas. In this position, when power generation using the exhaust gas is required, the flap 140 is initialized so that the flap 140 is rotated by the ejection flow of the exhaust gas, thereby generating electricity. When the vehicle is accelerated in a stopped state, the controller 300 forcibly rotates the flap 140 using the motor generator 200 so that the remainder of the exhaust gas inside the exhaust gas pipe 10 is ejected.

In general, when a vehicle is stopped after being driven, some exhaust gas remains inside the exhaust gas pipe 10. The remaining exhaust gas reduces an engine torque during driving. Therefore, when the vehicle is accelerated in the stopped state, it is possible to discharge the remaining exhaust gas from the exhaust gas pipe 10 by forcibly rotating the flap 140 using the motor generator 200, thereby improving the engine torque and fuel efficiency. When the backpressure due to the exhaust gas is required to be reduced, the controller 300 adjusts the flap 140 to be parallel to the ejection flow of the exhaust gas by controlling the motor generator 200.

When the backpressure is required to be reduced is the state in which the vehicle is being accelerated or being driven at a high speed, in which the amount of the exhaust gas that is ejected increases. In this case, when electricity is generated using the exhaust gas or the flap 140 blocks part of the exhaust gas that is ejected, a high backpressure occurs inside the exhaust gas pipe 10, which can cause a discharge operation to malfunction and decrease the output of an engine. Therefore, when the vehicle is being accelerated or driven at a high speed, the flap is adjusted so that it is oriented parallel to the ejection flow of the exhaust gas, thereby minimizing the backpressure due to the exhaust gas and maintaining the acceleration.

In addition, the controller 300 may be configured to tune discharge noises of the exhaust gas by fixing the flap 140 at a predetermined angle using the motor generator 200. Consequently, it is possible to decrease a driver's displeasure due to noises and vibration by setting discharge noises of the exhaust gas to a level as required by a driver. Here, discharge noises are tuned by adjusting the flap 140 at a predetermined angle depending on the setting selected by the driver, and the flap 140 is fixed during the tuning of discharge noises so that power generation using the motor generator 200 is not carried out. In addition, the controller 300 can tune discharge noises by controlling the speed of rotation of the flap 140 by adjusting the rotational torque of the motor generator 200.

Figure 4:
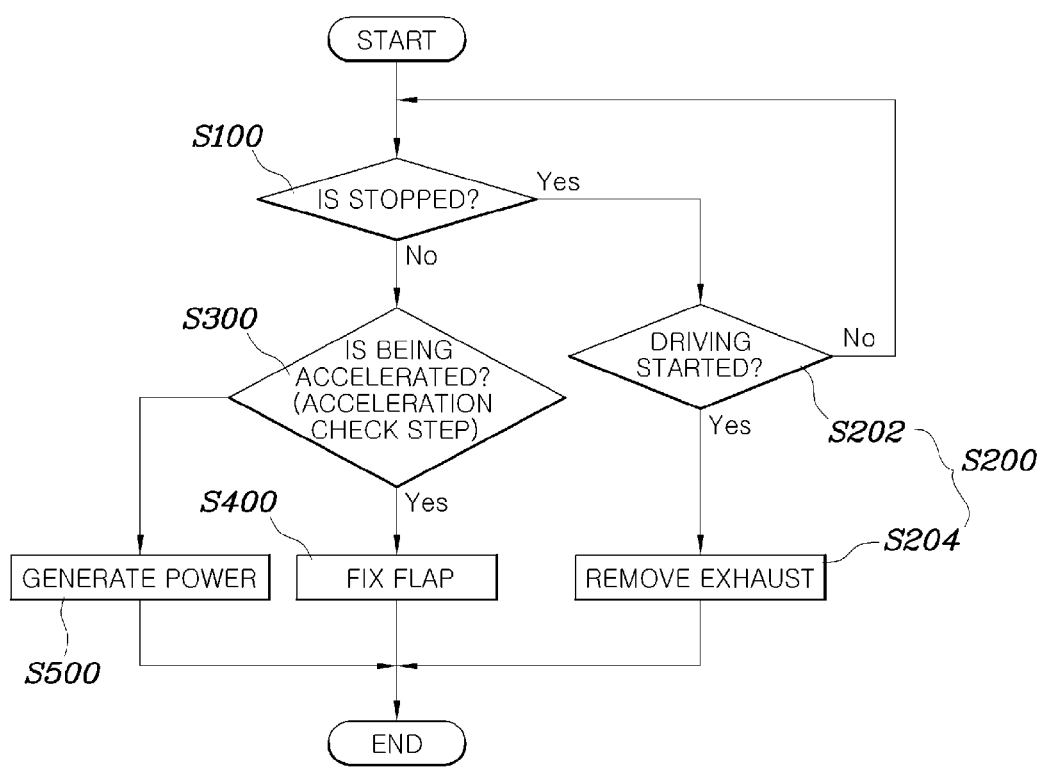
FIG. 4 is a flowchart showing a method for recovering exhaust kinetic energy according to an exemplary embodiment of the present invention.

FIG. 4 is a flowchart showing a method for recovering exhaust kinetic energy according to an exemplary embodiment of the present invention, in which the apparatus for recovering exhaust kinetic energy as claimed in claim 1 is used. The method for recovering exhaust kinetic energy according to this exemplary embodiment includes a stop check step S100 of checking, by the controller 300, whether or not a vehicle is in a stopped state, a gas removing step S200 of, when the vehicle is in the stopped state, forcibly rotating, by the controller 300, the flap of the valve assembly using the motor generator at a time point when the vehicle starts being driven, an acceleration check step S300 of, when the vehicle is not in the stopped state, checking, by the controller 300, whether or not the vehicle is being accelerated, a flap fixing step S400 of, when the vehicle is being accelerated, fixing, by the controller 300, the flap to be parallel to an ejection flow of the exhaust gas, and a power generation step S500 of, when the vehicle is not being accelerated, controlling, by the controller, the flap to generate electricity from the exhaust gas that is ejected using the motor generator.

According to the present invention, it is possible to discharge the remainder of the exhaust gas inside the exhaust gas pipe through the gas removing step S200 of forcibly rotating the flap of the valve assembly using the motor generator when the vehicle starts being driven from the stopped state. This can consequently improve the engine torque and fuel efficiency. When the vehicle is being accelerated, the flap fixing step S400 of fixing the flap to be parallel to the ejection flow of the exhaust gas is carried out. In this step, it is possible to minimize the backpressure and the acceleration by adjusting the flap to be parallel to the ejection flow of the exhaust gas by controlling the motor generator. When the vehicle is not being accelerated, the power generation step S500 is carried out by adjusting the angle of the rotary shaft so that the flap is oriented corresponding to the exhaust gas that is ejected and thus the motor generator generates electricity from the exhaust gas that is ejected.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. An apparatus for recovering exhaust kinetic energy, comprising:
   a valve assembly including a rotary shaft which is disposed in an exhaust gas pipe and a flap which is disposed on the rotary shaft, the flap being rotated by an exhaust gas that is ejected;
   a motor generator connected to the rotary shaft of the valve assembly, the motor generator configured in a first instance to generate electricity using a rotational force transmitted by the rotary shaft and in second instance apply a torque to the rotary shaft; and
   a controller configured to fix the rotary shaft of the valve assembly at a predetermined angle in the first instance and adjust a speed of rotation of the rotary shaft by controlling the motor generator in the second instance.

2. The apparatus of claim 1, further comprising a space section in a partial region of the exhaust gas pipe, the space section protruding from a side of the exhaust gas pipe and communicating with the exhaust gas pipe, wherein the valve assembly is disposed between the space section and an inner space of the exhaust gas pipe.

3. The apparatus of claim 2, wherein the rotary shaft of the valve assembly is positioned inside an inner space where the space section communicates with the exhaust gas pipe, and the flap is configured such that the flap closes the inner space of the space section when the flap is oriented parallel to an ejection flow of the exhaust gas.

4. The apparatus of claim 2, wherein the rotary shaft of the valve assembly is positioned at the portion when the outer periphery of the exhaust gas pipe extends, and the flap is configured such that the flap closes the inner space of the space section when the flap is oriented parallel to an ejection flow of the exhaust gas.

5. The apparatus of claim 1, wherein the motor generator includes a rotation angle detector which detects an angle of rotation of the rotary shaft of the valve assembly and sends the angle of rotation of the rotary shaft to the controller.

6. The apparatus of claim 1, wherein the controller is configured to initialize the flap by controlling the motor generator when power generation due to the exhaust gas is required when the flap is stopped.

7. The apparatus of claim 1, wherein the controller is configured to forcibly rotate the flap using the motor generator so that a remainder of the exhaust gas inside the exhaust gas pipe is discharged therefrom when a vehicle is accelerated from a stopped state.

8. The apparatus of claim 1, wherein the controller is configured to adjust the flap to be parallel with an ejection flow of the exhaust gas by controlling the motor generator when a backpressure due to the exhaust gas is required to be reduced.

9. The apparatus of claim 1, wherein the controller is configured to tune discharge noises of the exhaust gas by fixing the flap at a predetermined angle using the motor generator.

10. The apparatus of claim 1, wherein the controller is configured to tune discharge noises of the exhaust gas by controlling a speed of rotation of the flap by adjusting a rotational torque of the motor generator.

11. A method of recovering exhaust kinetic energy using the apparatus as recited in claim 1, the method comprising:
    checking whether or not a vehicle is in a stopped state;
    when the vehicle is in the stopped state, forcibly rotating the flap of the valve assembly using the motor generator at a time point when the vehicle starts being driven;
    when the vehicle is not in the stopped state, checking whether or not the vehicle is being accelerated;

when the vehicle is being accelerated, fixing the flap to be parallel to an ejection flow of the exhaust gas; and when the vehicle is not being accelerated, generating electricity from the exhaust gas that is ejected using the motor generator.

12. A non-transitory computer readable medium containing program instructions executed by the controller in claim 1, the computer readable medium comprising:

program instructions that check whether or not a vehicle is in a stopped state;

program instructions that forcibly control rotation of the flap of the valve assembly using the motor generator at a time point when the vehicle starts being driven when the vehicle is in the stopped state;

program instructions that check whether or not the vehicle is being accelerated when the vehicle is not in the stopped state;

program instructions that fix the flap to be parallel to an ejection flow of the exhaust gas when the vehicle is being accelerated; and program instructions that control the flap to generate electricity from the exhaust gas that is ejected using the motor generator when the vehicle is not being accelerated.

* * * * *